United States Patent
Ghiam

(10) Patent No.: US 6,387,484 B1
(45) Date of Patent: May 14, 2002

(54) FLEXIBLE POLYOLEFINS MASKING FILM

(75) Inventor: Farid F. Ghiam, Terre Haute, IN (US)

(73) Assignee: Tredegar Film Products Corporation, Richmond, VA (US)

( * ) Notice: Subject to any disclaimer, the term of this patent is extended or adjusted under 35 U.S.C. 154(b) by 0 days.

(21) Appl. No.: 09/321,026

(22) Filed: May 27, 1999

Related U.S. Application Data

(63) Continuation-in-part of application No. 08/877,073, filed on Jun. 17, 1997, now Pat. No. 6,040,046.
(60) Provisional application No. 60/086,897, filed on May 27, 1998.

(51) Int. Cl.$^7$ .................................................. B32B 7/12
(52) U.S. Cl. ................................. 428/343; 428/355 AC
(58) Field of Search ........................... 428/343, 355 AC

(56) References Cited

U.S. PATENT DOCUMENTS

| | | | |
|---|---|---|---|
| 3,420,679 A | 1/1969 | Gifford et al. ................. 99/171 |
| 3,503,843 A | 3/1970 | Williams, Jr. et al. ....... 526/351 |
| 3,725,121 A | 4/1973 | Fournier ..................... 117/122 |
| 3,746,566 A | 7/1973 | Hiratsuka ................... 428/412 |
| 3,776,805 A | 12/1973 | Hansen ....................... 428/412 |
| 3,823,032 A | 7/1974 | Ukai ............................ 117/172 |
| 3,892,900 A | 7/1975 | Shima et al. ................. 428/40 |
| 3,962,502 A | 6/1976 | Rackley ....................... 427/444 |
| 4,189,420 A | 2/1980 | Sugimoto et al. .......... 260/31.6 |
| 4,420,520 A | 12/1983 | Jones et al. ................. 118/504 |
| 4,447,485 A | 5/1984 | Aritake ....................... 428/144 |
| 4,477,502 A | 10/1984 | O'Sullivan .................... 428/35 |
| 4,699,842 A | 10/1987 | Jorgensen et al. .......... 428/343 |
| 4,720,416 A | 1/1988 | Duncan ....................... 428/195 |
| 4,810,574 A | 3/1989 | Anher ......................... 428/355 |
| RE32,929 E | 5/1989 | Ewing ......................... 428/220 |
| 4,895,760 A | 1/1990 | Barger et al. ............... 428/332 |
| 4,978,436 A | 12/1990 | Kelly .......................... 204/165 |
| 5,085,908 A | 2/1992 | Sano et al. .................... 428/40 |
| 5,100,709 A | 3/1992 | Barger et al. ................. 428/41 |
| 5,112,674 A | 5/1992 | German et al. ............. 428/216 |
| 5,169,900 A | 12/1992 | Gudelis ....................... 525/106 |
| 5,445,883 A | 8/1995 | Kobayashi et al. ......... 428/355 |
| 5,660,901 A | 8/1997 | Wong ......................... 428/35.7 |
| 5,693,405 A | 12/1997 | Harvie et al. ............... 428/156 |
| 5,714,221 A | 2/1998 | Sugibuchi ................... 428/41.8 |
| 5,723,546 A | 3/1998 | Sustic ......................... 525/240 |
| 5,783,272 A | 7/1998 | Wong ......................... 428/35.7 |
| 5,840,430 A | 11/1998 | Ramsey et al. ............. 428/516 |
| 5,861,202 A | 1/1999 | Kimura et al. .............. 425/105 |

FOREIGN PATENT DOCUMENTS

| | | |
|---|---|---|
| EP | 0311425 | 4/1989 |
| EP | 0434180 | 6/1991 |
| EP | 0448872 | 10/1991 |
| EP | 0475306 | 3/1992 |
| GB | 1458712 | 12/1976 |
| JP | 53-58578 | 5/1978 |
| JP | 61-116541 | 6/1986 |
| WO | 96/21556 | 7/1996 |

OTHER PUBLICATIONS

JP–4903493 Database WPI Section CH., Week 7446, Derwent Publications Ltd., London, GB; AN 74–79849V XP 002113209, Mar. 30, 1974 Abstract.

*Primary Examiner*—Terrel Morris
*Assistant Examiner*—Arti R. Singh
(74) *Attorney, Agent, or Firm*—Jenkens & Gilchrist, P.C.

(57) ABSTRACT

An improved masking film provides an adequate level of protection to relatively smooth surfaces by providing an adjustable and controlled level of adhesion between the masking film and the surface to be protected without the use of corona treatment or an adhesive under a variety of production and application conditions. The use of varying blends of materials and percentages thereof allows for control of the adhesion level produced between the improved masking film and the substrate surface to be protected. Using the improved masking film of the present invention, the masking film can be customized for a set of production conditions and desire application and will remain removably adhered to the substrate following a heat-loading process such as thermoforming, drape-forming or heat-bending.

14 Claims, No Drawings

FLEXIBLE POLYOLEFINS MASKING FILM

RELATED PATENT APPLICATIONS

This application is a continuation in part of commonly-owned U.S. patent application Ser. No. 08/877,073, entitled "Improved Masking Film and Method for Producing Same", filed on Jun. 17, 1997, now U.S. Pat. No. 6,040,046. This application also claims the benefit of U.S. provisional Patent Application No. 60/086,897, entitled "Flexible Polyolefins Masking Film and Method for Producing Same", filed on May 27, 1998. Both of these applications are incorporated in their entirety herein by specific reference thereto.

INTRODUCTION

The present invention relates to masking films and, more specifically, to a masking film which removably adheres to rigid, relatively smooth-surfaced substrates under a variety of conditions without the need for corona treatment or an adhesive.

BACKGROUND OF THE INVENTION

Masking films are used in numerous applications as a protective coating or covering for surfaces, particularly smooth surfaces, such as acrylics, glass, polished or painted metals, glazed ceramics, and other smooth, relatively rigid surfaces. The masking film is applied to the surface to be protected and acts as a physical barrier to prevent scratching, scuffing and marring of the surface. Protection provided by masking films is particularly useful while these surfaces are being printed, transported, or otherwise handled prior to use.

Traditionally, protection for smooth surfaces has been provided via corona treated films and/or adhesive coated masking paper. Corona treated films are films exposed to an electrostatic discharge to increase the adhesion level of the film. This is accomplished through the production of surface oxidation of the film via the electrostatic discharge, increasing the attraction between the nonpolar surface of the film and the polar surface of the material to be protected. Such corona treated films are typically non-embossed and rely on a very narrow window of corona treatment to facilitate enhanced adhesion. However, disadvantages exist with this technique. For example, where too little corona treatment occurs, the masking film will not adhere to the surface to be protected. Conversely, where too much corona treatment occurs, it is common to find the masking film laminating to itself and/or laminating completely to the surface to be protected, at best requiring additional time, effort and costs to completely unwind the masking film and/or remove the masking material from the protected surface, and, at worst, ruining the protected material for its intended end use. Additionally, since corona treated masking films have a relatively high surface coefficient of friction, rigid wrinkles commonly form in the masking film. Such wrinkles are difficult, if not impossible, to remove, thus precluding the film from adequately protecting the surface to be protected and/or permanently distorting the surface to be protected, again ruining it for its intended purpose. Finally, corona treated polyethylene films commonly have numerous large gels and carbon specks associated with them which can produce dimples in, or otherwise mar, the surface to be protected. Gels are defined as unmelted polyethylene particles which range from a barely visible size up to larger than a pencil point.

Disadvantages are also associated with masking films using an adhesive coated paper. For example, where a masking material requiring an adhesive coating is used, moisture from atmospheric humidity or elsewhere can permeate the masking material and loosen or completely separate the masking material from the substrate surface to be protected. The tendency for moisture to adversely affect the performance of this type of masking film is increased where heat is required to activate the adhesive coating. Additionally, even where the masking material remains firmly adhered to the surface to be protected until its removal is desired, such removal can require the use of a solvent to remove trace amounts of the adhesive coating. The adhesive residue left behind on the surface is of particular concern where the surface being protected is to be used in a context where sanitary conditions are desired, such as in food industry applications. The use of an adhesive coating also requires the additional steps of applying the adhesive coating to the preformed film, as well as the expense of using, activating and storing one or more adhesives to be used as a coating. Finally, where heat-activated adhesive coatings are used, the time and expense of providing the proper amount of heat to the process to facilitate proper adhesion further complicates the process.

Recent advances in masking film technology have produced improved masking films formed without corona treatment or the use of adhesive coatings, including one side smooth, one side matted ("OSM") masking films. Such OSM films are more fully described in U.S. Pat. Nos. 4,895,760 and 5,100,709, both assigned to Tredegar Industries, Inc., Richmond, Va. These advanced masking films rely upon the tendency for smooth surfaces to adhere to each other to produce an adequate and constant level of adhesion without the need for corona treatment and the use of adhesive coatings. Additionally, the matted side of the OSM films prevents blocking and wrinkling of such films by preventing a measure of intimate contact between the surfaces. Importantly, these improved OSM films avoid the numerous problems associated with the use of corona treatment and adhesives and are stable over time, even when exposed to moisture and ultraviolet light.

Despite the advanced nature of the OSM films, however, it was discovered that the level of adhesion produced by these improved masking films can vary with temperature and other conditions associated with the production and use of such improved films. At times, such conditions can result in a masking film exhibiting either too much or not enough adhesion level for the desired application. In other applications, it can result in the need for heaters to raise the temperature of the sheet so that proper application and adequate adhesion level are achieved. Moreover, since the level of adhesion produced is primarily a function of the interaction between the smooth surface of the masking film and the smooth surface to be protected, the smoothness of the surface requiring protection is a significant factor. This factor can present difficulties, and masking films of this type are of limited utility, where the surface to be protected is not particularly smooth.

Methods for producing such prior art films are relatively rigid and do not offer flexibility in the recipe for such films, thus producing films incapable of producing a variety of adhesion levels under a variety of production conditions for a variety of applications.

Thus, there remains a need for a masking film capable of providing an adequate level of protection to merely relatively smooth surfaces by providing a functional, adjustable and controlled level of adhesion between the masking film and the surface to be protected without the use of corona treatment or an adhesive and their associated disadvantages and under a variety of production and application conditions, and a method for producing same.

SUMMARY OF THE INVENTION

In accordance with the present invention there is provided a masking film which adheres to and provides protection for a relatively smooth surface without the need for an adhesive layer or corona treatment. Additionally, the improved film is preferably of the one side matted type so that blocking and wrinkling of the film are substantially minimized, if not completely eliminated. Moreover, the adhesion produced is not as dependent upon the smoothness of the surface to be protected. Importantly, the level of adhesion produced by the improved OSM film is adjustable so as to accommodate a variety of production and application conditions. For example, the improved masking film of the present invention will provide a functional level of adhesion to uncoated polycarbonates, acrylics, polyvinyl chlorides and polyesters at room or ambient temperature. Accordingly, for virtually any given processing environment, including temperature and line equipment layout, and desired application, the improved masking film of the present invention can provide an adequate level of adhesion to the substrate of interest. The improved masking film of the present invention also remains removably attached to a substrate surface even after the application of post-production heat loading processes, including, but not limited to, thermoforming, drape-forming and heat-bending.

The improved masking film of the present invention comprises a film preferentially having a smooth side, a rough side and, optionally, one or more core layers interposed between the smooth side and the rough side. The monolayer is preferably extruded and the multiple layers are preferably coextruded. The smooth side comprises at least one layer of a thermoplastic film. In use, the smooth side is applied to the relatively smooth surface to be protected. The rough side is also comprised of at least one layer of a thermoplastic film. The rough side is preferably matte embossed, but can be roughened via any suitable means. The rough side prevents the film from contacting as much surface area of itself, or any other surface, preventing blocking and wrinkling of the film. At least one core layer may be interposed between the smooth side and the rough side of the improved masking film and, if present, is also comprised of a thermoplastic film. In the monolayer embodiment, the smooth side and rough side are opposing sides of the single layer of the film.

The level of adhesion produced between the smooth side of the masking film of the present invention and the surface to be protected is adjustable via the introduction of certain polymers and co-polymers associated with the smooth side of the film. The controlled combination of such polymers and co-polymers has the affect of adjusting the level of adhesion produced between the smooth side of the masking film and the surface to be protected by the masking film. The identity and quantities of these polymers are dictated by the conditions (e.g., temperature) under which the masking film will be applied and ultimately used. Thus, for example, the masking film of the present invention can be produced so as to provide a functional and controlled level of adhesion to acrylics at room temperature without subsequent laminating or welding during heat-loading processes, such as thermobending or thermoforming. The level of adhesion can be adjusted to provide adequate levels of adhesion with substrates at a higher temperature.

In other embodiments of the improved masking film of the present invention, a one, two or multilayered masking film is produced including the polymer and co-polymer additives capable of adjusting the level of adhesion produced by the film. These films can be blown or cast. Monolayer or coextrusion of multiple layers may be employed. Additionally, in the multilayered embodiment, the layer including the smooth side of the improved masking film of the present invention may be laminated to the layer including the rough side, if desired. The blending of polymer and co-polymer additives of the smooth side of the masking film is controlled to produce desired tackiness of the resulting masking film.

According to the method of the present invention, the improved masking film is produced by preselecting the one or more primary components comprising the first skin of the improved masking film of the present invention. It is the surface of this first skin layer which will ultimately intimately contact and adhere with the surface of the substrate to be protected. Once selected, the relative percentages of the one or more components is also predetermined so as to produce a functional and controlled level of adhesion force produced under a given set of the substrate's production conditions and environment.

The remaining skin and core layers, if present, are formed of a thermoplastic. The skin and core layers are preferably coextruded to form the improved masking film of the present invention. Due to the preselection of the components and their relative amounts, the resulting masking film is tailored to perform in the given production environments under the given conditions.

DETAILED DESCRIPTION

In a preferred embodiment of the improved masking film of the present invention, a first layer having at least one smooth surface and a second layer having at least one rough surface and, optionally, at least one core layer are coextruded to form an improved masking film. Each of the layers is comprised of a thermoplastic film. Preferred films include as at least a primary component blend of flexible polyolefins ("FPOs"), such as REXflex FPO products available from Rexene Company/Huntsman Chemical. FPOs are products based upon polypropylene having a controlled level of crystallinity, preferably ranging from about 40% to about 90%. Both homopolymers and copolymers of FPOs exist and are contemplated by this invention. The thermoplastic films making up the layers of the improved masking film of the present invention also may include films of: polyolefins (homopolymers and copolymers), polyvinyl alcohol, polyvinyl chloride, nylon, polyester, polystyrene, polymethylpentene, polyoximethylene, and the like, or blends thereof. Acid modified copolymers, anhydride modified copolymers and acid/acrylate modified copolymers are also useful.

The first layer includes a surface having a measure of smoothness within an operational range of about 0 Ra to 60 Ra. While films the range of about 0 Ra to about 10 Ra are preferred, films in the range of about 10 Ra to about 30 Ra are also desirable. Note that the range of roughness for the substrate to which the film is applied is usually between 0 Ra and 150 Ra. Of course, smoother substrates will generally allow the masking film to adhere more readily. The relatively rough surface of the second layer generally possesses a measure of roughness between 65 Ra and 600 Ra, and more preferably, between 100 Ra and 300 Ra. For purposes of this application, smoothness and roughness will be defined as the arithmetic average height (Ra) of the micropeaks and microvalleys of a surface to the center line of such surface as measured by a profilometer. Smoothness and roughness defined in this manner is typically expressed with units of microinches ($10^{-6}$ inches). All testing of surface textures (relative smoothness and roughness) were conducted in accordance with ANSI/ASME Test Method B46.1-1985, the entire content of which is incorporated herein by reference. Although measures between about 0 Ra and 60 Ra are preferred for the smooth side, and measures between about 65 Ra and 600 Ra are preferred for the rough side, it is noted that the present invention contemplates having virtually any level of relative smoothness and roughness that will prevent much of the blocking and wrinkling associated with traditional masking films. Matte embossing by extruding into a pair of nip rollers in which one roll is a polished chrome casting roll and the other roll is rubberized is a preferred technique for imparting a sufficient level of smoothness/roughness to each side of the film. The extruded film engages the pair of nip rollers in a molten state. The polished chrome casting roll will help impart the characteristics of the smooth surface of the film and the rubberized roll will help impart the characteristics of the rough surface of the film. Although matte embossing has been described as a preferred technique by which the second layer is provided with roughness, it should be noted that the roughing of the surface of the second layer may be accomplished via any suitable method or means, if desired.

It is noted that although the preferred embodiment includes at least a first layer and a second layer, the relatively smooth side and the relatively rough side of the improved masking film of the present invention can be formed on opposite sides of a single layer of thermoplastic material, if desired. In such an embodiment, no core layers would be present.

In embodiments having multiple layers fillers may be added to the relatively rough layer to provide certain desired characteristics, including, for illustrative purposes only, roughness, abrasion resistance, printability, writeability, opacity and color. Such fillers include, for illustrative purposes only, calcium carbonate (abrasion resistance), mica (printability), titanium dioxide (color and opacity) and silicon dioxide (roughness).

Also, the degree of relative roughness desired in the roughened side of the film can be imparted via any suitable means known in the art, including, without limitation, air impingement, air jets, water jets, and combinations thereof.

In a preferred embodiment, the multiple layers of the improved masking film of the present invention are coextruded using any coextrusion process known in the art. The use of coextrusion allows for the relatively simple and easy manufacture of a multilayered masking film composed of distinct layers, each performing specific functions. Although coextrusion of the improved multilayered masking film of the present invention is preferred, it is again noted that the improved masking film can be monolayered or multilayered and that, regardless of form, the improved masking film can be produced using other suitable methods, if desired.

In use, the relatively smooth surface of the first layer of the improved masking film of the present invention is brought into intimate contact with a relatively smooth surface to be protected. Preferred substrates for such surfaces include, by way of illustration only, polycarbonate, acrylic (PMMA), polyvinyl chloride, polyethylene terephthalate, polyethylene terephthalate glycol, glass, ceramic and metal. The smooth, adhesiveless masking film surface clings to the substrate via the natural blocking adhesion found in applying one very smooth surface to another. It is applicants belief that these surfaces are held together by physical interactions which may be attributable to the surface tension, Van der Waals interaction, polarity, and/or molecular diffusivity of the adhesiveless masking film of the present invention.

Any one or more of a number of conventional application methods can be used to bring the smooth side of the first layer of the improved masking film into intimate contact with the smooth surface of the substrate to be protected by the masking film. Typically, the improved masking film will be applied to the surface to be protected via a nip roll or similar system through which the multilayered film and the substrate surface to be protected are passed simultaneously. If desired, the resulting article can be passed through compression rolls or the like for further processing. Any other suitable method for combining the multilayer film with the substrate surface to be protected can be used, if desired.

Turning now to the adhesion properties produced between the smooth side of the first layer of the improved masking film of the present invention and the substrate surface to be protected, a significant improvement in OSM masking films has been achieved with the improved masking film of the present invention due to its ability to have the adhesion level adjusted according to specific production and application conditions. Adjustment of the adhesion level at specific temperatures allows the improved masking film of the present invention to be used for certain substrates at room temperature. Traditional OSM masking films must be heated above room temperature to produce the desired level of adhesion. For example, in some applications, latent heat within the substrate's surface to be protected creates a desired adhesion level. However, this will vary from machine to machine in a single process, and even more widely between processes, thus making the use of OSM masking films more difficult and expensive since adjustments in procedure and/or equipment are needed to consistently achieve a desired level of adhesion. Additionally, in some instances where post-production heat-loading processes, including, but not limited to, thermoforming, drape-forming and heat-bending are employed with prior art masking films, the masking film is destroyed upon subsequent attempts to remove the film. Destruction of the masking film occurs in these attempts at removal since the heat-loading has increased the adhesion force between the substrate surface and the masking film to a point where the peel strength needed to remove the masking film exceeds the tensile strength of the masking film itself thus causing the film to tear or break before it will peel away from the substrate.

Adjustment of the adhesion properties produced in the present invention is accomplished through the introduction of certain polymers and copolymers into the smooth side of the thermoplastic film independent of varied levels of, or even the complete absence of, latent or added heat. The primary polymer associated with the smooth side of the first layer to affect the adhesion level produced is a homopolymer or copolymer form of FPO, or blends thereof, such as REXFlex FPO products available from Rexene Corp./Huntsman Chemical. Secondary polymers such as polyolefins (homopolymers or copolymers), metallocene catalyzed polyolefins (e.g., mPE), styrenes, butylenes, polyvinyl alcohols, nylons, polyesters, polyvinyl chlorides, polymethylpentene, polyoximethylene, and copolymers or mixtures thereof, are blended at varying ratios with the primary polymer (e.g., FPO) to control the level of adhesion of the film. Acid modified copolymers, anhydride modified copolymers and acid/acrylate modified copolymers are also useful as secondary polymer components.

Generally, increasing the percentage of primary polymer in the film will increase the temperature range in which the film will produce the desired level of adhesion to the substrate. The particular primary polymer is selected based upon the desired adhesion level necessary for the film. The secondary polymers provide the ability to increase or decrease the specific adhesion level of the film over the temperature range.

As previously discussed, depending upon the desired application, the polymer and copolymer blends may be modified for improved performance. Although a primary component and a secondary component are described herein, it is noted that various embodiments of the present invention masking film including only a primary component exist and are useful as described herein. Such a primary component embodiment could be composed of one or more of any of the polymers/copolymers listed herein.

Various embodiments of the masking film of the present invention are further illustrated by the numerous examples shown in Tables 1–8. Each of the example masking films presented are coextruded with three layers. The smooth layer of each film is designated by the letter "S", the roughened layer by the letter "R", and the core layer by the letter "C". Also, various commercial polymers are designated herein by generic polymer abbreviations. The primary polymer components used in the "S" layer include: REXFlex W102 homopolymer (medium crystallinity), REXFlex W107 homopolymer (high crystallinity), and REXFlex W201 copolymer (low crystallinity) all of which are available from Rexene Corp./Huntsman Chemical. Additional polymer components used throughout include: 964 Low Density Polyethylene (LDPE) from Eastman Chemicals, 2247A Linear Low Density Polyethylene (LLDPE) from Dow, PL1850 Metallocene Polyethylene (mPE) from Dow, EG8200 Metallocene Polyethylene (EG8200) from Dow, 2121 Low Density Polyethylene (2121) from Chevron, 6573 Ethylene/Propylene (EP) copolymer form Fina, and a 50/50 wt % tackifier blend (tack.) of 2247A LLDPE and Regalite R91 hydrogenated styrene monomer from Hurcules.

With reference now to Table 1, the force required to peel several example films produced with W102 FPO applied to a polycarbonate substrate are shown. The substrate temperature indicates the temperate of the substrate when the masking film was applied. Table 2 illustrates the peel force results collected from several example film blends of W102 and W201 FPOs applied to polycarbonate. Table 3 shows the results of further heat treatment of example films introduced in Tables 1 and 2. Turning now to Table 4, additional example films applied to polycarbonate are presented. These films differ from those shown in Tables 1–3 by the inclusion of a tackifier blend which in combination with the FPO used yields desirable post drying properties. Tables 5–7 present similar test results for the example films when applied to an acrylic substrate. Table 8 illustrates the results achieved by several alternative film examples which appear to be particularly suited to acrylic substrates.

The test data appearing in the accompanying Tables were produced and gathered according to the following test procedures.

The smooth side of a coextruded film was made by blending various percentages of a FPO homopolymer and a secondary polymer. For room temperature tests, the masking film was placed on an acrylic or polycarbonate sheet at room temperature (about 73° F.) and nip rolled to remove any air. It was then tested for peel force, expressed in units of g/in. For higher temperature masking, the unmasked sheet was heated in an oven for ten minutes at the specified application temperature and was then masked, nipped, and cooled to room temperature prior to testing. A one inch strip of the masking film was used in a 180° peel test. The peel test was conducted according to a modified version of ASTM Standard D3330-90, which is incorporated herein by reference. An Instron tensile testing machine was used to measure the force required to peel 4–6 inches length of a one inch wide strip of masking film from the acrylic sheet.

All of the samples tested above were further tested for performance subsequent to undergoing a heat-loading process, such as thermoforming, drape-forming and heat-bending. In the heat-bending procedure, the sample sheet was heated to its softening point using a conventional "strip heater". The softening point was visually inspected by recording the temperature at which the sheet becomes pliable; The temperature of such bending was at or above 100° C. for acrylic and 150° C. for polycarbonate. Once the sheet was bent to the predetermined angle, the sheet was allowed to cool to maintain the desired angle. For thermoforming, the sheet samples were heated to or above their glass transition temperature and then forced via vacuum into a desired shape using a vacuum mold. All of the samples performed well under these heat-loading tests in that the improved masking films of the present invention were peeled from the surface after such heat-loading treatment without destruction of the masking film.

As evidenced by the foregoing, by varying the blend components and the percentages thereof comprising the improved masking film of the present invention, the level of adhesion produced between the improved masking film of the present invention and the substrate surface to be protected, as expressed by the peel force numbers in the Tables, is also adjusted. Thus, using the improved masking film of the present invention, it is possible to: (a) apply the film to the substrate over a broader range of temperatures to obtain a desired adhesion level by selecting the appropriate blend of materials and percentages thereof; and (b) use the improved masking film of the present invention on substrates subject to post-production heat-loading processes (e.g., thermoforming, drape-forming and heat-bending) without destruction of the film upon subsequent removal thereof.

As stated above, the improved masking film of the present invention is thus capable of providing a controlled, adjustable and adequate level of protection to smooth surfaces of substrates by providing a controlled level of adhesion between the masking film and the surface to be protected without the use of corona treatment or an adhesive and their associated disadvantages and under a variety of production and application conditions. The unique advantages of the improved masking film of the present invention allow the film to be modified to meet the desired application and processing environment.

According to a preferred method of the present invention, the above-identified improved masking film is produced employing the steps of preselecting one or more primary polymers (e.g., FPOs) of the at least one first skin layer of the film; preselecting one or more additional elements of the at least one first skin layer of the film; predetermining the relative percentages of each constituent element selected; coextruding the at least one first layer with the at least one second layer and the at least one core layer to form a multilayered masking film. The resulting masking film is tailor made to perform (i.e., produce a desired level of adhesion) under a given set of production conditions and environment.

It has also been found that the average adhesion levels of masking films of the present invention constructed from dryable, heat bendable homopolymer grade FPOs remain fairly constant at a wide range of application temperatures. As illustrated in Tables 1–8, adhesion values to polycarbonate and acrylic remained relatively constant at various application temperatures and, in some cases, approached those of a masking film composed entirely of FPO homopolymer. However, following drying of the polycarbonate substrate for 24 hours at 230° F., the masking films containing the FPO primary component with tackifier additives as a secondary polymer component exhibited adhesion levels significantly lower than expected. As illustrated in Tables 1–8, the films without tackifiers showed either about the same or increased levels of adhesion after drying. This decreased adhesion post drying is a highly desirable characteristic within the masking film industry as it is a common practice to dry polycarbonate substrates to remove water prior to thermoforming. Further testing showed that the films with FPO and tackifiers also had either about the same or lower levels of adhesion to both acrylic and polycarbonate substrates after drying for 48 hours at 140° F. Again, this reduction in film adhesion may be desirable as it would allow the masking film to be readily removed form the substrate after shipping and storage. For example, masked sheets may be transported by trucks or stored in warehouses which are not always climate controlled.

Although preferred embodiments of the invention have been described in the Tables and foregoing Detailed Description, it will be understood that the invention is not limited to the embodiments disclosed, but is capable of numerous rearrangements and modifications of parts and elements without departing from the spirit of the invention as defined in the following claims.

TABLE 1

(Showing peel force from a PC substrate in g/in)

| Substrate Temp. (° F.) | 120 | 140 | 160 | 180 | 190 | 200 | 220 | 225 | 270 | 270 + dry 24 hr at 230 |
|---|---|---|---|---|---|---|---|---|---|---|
| S = W102(FPO homopolymer) R = C = LLDPE/LDPE blend | 26.88 | 26.15 | 26.26 | 28.99 | | 30.14 | 33.52 | | 30.03 | 244 |
| S = 80/20 blend of W102/2121 R = C = LLDPE/LDPE blend | 18.23 | 18.03 | 20.14 | 20.82 | | 22.88 | 24.90 | | 19.82 | 166 |
| S = 80/20 blend of W102/mPE R = C = MDPE/LDPE blend | | | | | 25.76 | | | 27.47 | 23.50 | 217 |
| S = 70/30 blend of W102/mPE R = C = MDPE/LDPE blend | | | | | 22.34 | | | 21.27 | 14.70 | 17.0 |
| S = 80/20 blend of W102/mPE R = C = LDPE | 17.50 | 19.30 | 20.10 | 24.70 | 18.10 | 30.60 | 35.20 | 23.00 | 38.00 | 185 |
| S = 70/30 blend of W102/mPE R = C = LDPE | 11.73 | 14.42 | 17.24 | 21.09 | 15.65 | 26.51 | 31.37 | 20.93 | 28.46 | 38.0 |

TABLE 2

(Showing peel force from a PC substrate in g/in)

| Substrate Temp. | 120° F. | 140° F. | 160° F. | 180° F. | 200° F. | 220° F. | 270° F. + dry 24 hr at 230 |
|---|---|---|---|---|---|---|---|
| S = 90/10 blend of W102/W201 (FPO) R = C = LDPE | 122.9 | 127.4 | 118.6 | 122.4 | 115.6 | 93.46 | 330 |
| S = 80/20 blend of W102/W201 (FPO) R = C = LDPE | 78.47 | 89.29 | 98.45 | 107.0 | 103.3 | 78.45 | 342 |
| S = 70/30 blend of W102/W201 (FPO) R = C = LDPE | 61.04 | 63.05 | 62.91 | 66.41 | 73.46 | 64.00 | 138 |
| S = 60/40 blend of W102/W201 (FPO) R = C = LDPE | 48.88 | 51.21 | 53.48 | 61.54 | 58.95 | 53.62 | 332 |

TABLE 3

(Showing peel force from a PC substrate in g/in)

| Oven Temp. | 30 min. at 200° F. | 30 min. at 212° F. | 30 min. at 220° F. |
|---|---|---|---|
| S = 80/20 blend of W102/mPE<br>R = C = MDPE/LDPE blend | 46.45 | 56.70 | 82.56 |
| S = 70/30 blend of W102/mPE<br>R = C = MDPE/LDPE blend | 51.32 | 47.29 | 33.20 |
| S = 80/20 blend of W102/mPE<br>R = C = LDPE | 27.44 | 38.87 | 67.13 |
| S = 70/30 blend of W102/mPE<br>R = C = LDPE | 21.82 | 30.21 | 32.86 |
| S = 70/30 blend of W102/W201(FPO)<br>R = C = LDPE | 78.16 | 93.71 | 312.7 |
| S = 60/40 blend of W102/W201(FPO)<br>R = C = LDPE | 73.96 | 72.26 | 242.8 |

TABLE 4

(Showing peel force from a PC substrate in g/in)

| Substrate Temp. (° F.) | 73 | 120 | 140 | 160 | 180 | 200 | 220 | 230 | 270 | 270 + dry 24 hr at 230 | 270 + dry 48 hr at 140 |
|---|---|---|---|---|---|---|---|---|---|---|---|
| S = 60/20/20 LLDPE/W102/tack.<br>R = LDPE, C = LLDPE | 127.8 | 100.7 | 97.86 | 99.86 | 82.24 | 85.21 | 69.58 | | 73.57 | 33.0 | 68.0 |
| S = 60/20/20 LLDPE/W102/tack.<br>R = LDPE, C = HDPE | 113.5 | 129.7 | 113.7 | 110.9 | 96.16 | 98.29 | 84.19 | | 89.25 | 47.0 | 85.0 |
| S = 60/20/20 LLDPE/W102/tack.<br>R = LDPE, C = EP copolymer | 119.7 | 146.0 | 162.7 | 156.9 | 128.8 | 103.7 | 68.86 | | | 37.0 | 61.0 |
| S = 60/20/20 LLDPE/W102/tack.<br>R = LDPE, C = 95/5 LLDPE/tack. | 78.36 | 118.0 | 113.7 | 115.8 | 122.4 | 93.06 | 87.64 | 126.2 | 79.90 | 27.0 | 89.0 |
| S = 60/20/20 LLDPE/W102/tack.<br>R = LDPE, C = 90/10 LLDPE/tack. | 74.66 | 87.89 | 94.01 | 98.36 | 92.13 | 93.65 | 88.18 | 104.1 | 113.3 | 41.0 | 105 |
| S = 60/20/20 LLDPE/W102/tack.<br>R = LDPE, C = 85/15 LLDPE/tack. | 121.5 | 156.6 | 155.5 | 173.1 | 150.8 | 145.8 | 131.2 | 154.7 | 125.3 | 43.5 | |
| S = 60/20/20 LLDPE/W102/tack.<br>R = LDPE, C = 80/20 LLDPE/tack. | 77.04 | 116.8 | 125.6 | 125.8 | 129.2 | 135.0 | 123.2 | 127.7 | 126.4 | 77.0 | 188 |
| S = 70/15/15 LLDPE/W102/tack.<br>R = LDPE, C = 90/10 LLDPE/tack. | 189.4 | 92.22 | 83.25 | 99.29 | 81.42 | 78.00 | 39.28 | 74.19 | 55.88 | | |
| S = 80/10/10 LLDPE/W102/tack.<br>R = LDPE, C = 93/7 LLDPE/tack. | 54.79 | 58.99 | 52.19 | 49.49 | 47.70 | 43.61 | 29.73 | 35.38 | 25.20 | | |

TABLE 5

(Showing peel force from a PMMA substrate in g/in)

| Substrate Temp. | 120° F. | 140° F. | 160° F. | 180° F. | 200° F. | 220° F. |
|---|---|---|---|---|---|---|
| S = W102 (FPO homopolymer)<br>R = C = LLDPE/LDPE blend | 22.6 | 21.57 | 24.47 | 26.76 | 30.98 | 33.02 |
| S = 80/20 blend of W102/2121<br>R = C = LLDPE/LDPE blend | 15.20 | 14.42 | 17.49 | 18.85 | 22.09 | 22.11 |
| S = 80/20 blend of W102/mPE<br>R = C = LDPE | 22.23 | 22.79 | 25.02 | 26.92 | 32.30 | 36.34 |
| S = 70/30 blend of W102/mPE<br>R = C = LDPE | 15.29 | 17.49 | 20.66 | 24.93 | 28.06 | 33.18 |

TABLE 6

(Showing peel force from a PMMA substrate in g/in)

| Substrate Temp. | 120° F. | 140° F. | 160° F. | 180° F. | 200° F. | 220° F. |
|---|---|---|---|---|---|---|
| S = 90/10 blend of W102/W201<br>R = C = LDPE | 107.5 | 126.2 | 115.3 | 116.6 | 107.0 | 118.0 |

TABLE 6-continued (Showing peel force from a PMMA substrate in g/in)

| Substrate Temp. | 120° F. | 140° F. | 160° F. | 180° F. | 200° F. | 220° F. |
|---|---|---|---|---|---|---|
| S = 80/20 blend of W102/W201<br>R = C = LDPE | 77.23 | 162.1 | 95.14 | 90.63 | 88.00 | 84.89 |
| S = 70/30 blend of W102/W201<br>R = C = LDPE | 59.60 | 62.23 | 64.77 | 69.38 | 67.54 | 66.75 |
| S = 60/40 blend of W102/W201<br>R = C = LDPE | 53.09 | 51.37 | 53.48 | 57.29 | 59.51 | 62.32 |

TABLE 7

(Showing peel force from a PMMA substrate in g/in)

| Substrate Temp. (° F.) | 73 | 120 | 140 | 160 | 180 | 200 | 220 | 180 + dry 48 hr at 140 |
|---|---|---|---|---|---|---|---|---|
| S = 60/20/20 LLDPE/W102/tack.<br>R = LDPE, C = LLDPE | 238.3 | 95.57 | 119.8 | 85.23 | 103.5 | 84.37 | 73.53 | 72.5 |
| S = 60/20/20 LLDPE/W102/tack.<br>R = LDPE, C = HDPE | 158.7 | 171.5 | 152.1 | 137.4 | 128.7 | 111.1 | 95.14 | 91.5 |
| S = 60/20/20 LLDPE/W102/tack.<br>R = LDPE, C = EP copolymer | 219.7 | 179.8 | 157.5 | 164.0 | 115.9 | 101.3 | 220.0 | 73.0 |
| S = 60/20/20 LLDPE/W102/tack.<br>R = LDPE, C = 95/5 LLDPE/tack. | 147.0 | 151.8 | 151.0 | 145.0 | 132.0 | 125.0 | 108.0 | 120 |
| S = 60/20/20 LLDPE/W102/tack.<br>R = LDPE, C = 90/10 LLDPE/tack. | 83.3 | 106.6 | 113.1 | 108.5 | 124.4 | 114.4 | 116.4 | 117 |
| S = 60/20/20 LLDPE/W102/tack.<br>R = LDPE, C = 85/15 LLDPE/tack. | 105.6 | 156.6 | 172.4 | 175.0 | 163.5 | 160.1 | 144.9 | |
| S = 60/20/20 LLDPE/W102/tack.<br>R = LDPE, C = 80/20 LLDPE/tack. | 105.2 | 135.9 | 136.2 | 140.0 | 150.8 | 161.1 | 157.5 | 205 |
| S = 70/15/15 LLDPE/W102/tack.<br>R = LDPE, C = 90/10 LLDPE/tack. | 119.2 | 168.4 | 137.4 | 141.9 | 115.9 | 111.4 | 70.38 | |
| S = 80/10/10LLDPE/W102/tack.<br>R = LDPE, C = 93/7 LLDPE/tack. | 100.2 | 78.9 | 76.93 | 61.6 | 59.51 | 53.46 | 34.77 | |

TABLE 8

(Showing peel force from a PMMA substrate in g/in)

| Substrate Temp. | 73° F. | 100° F. | 120° F. | 140° F. | 160° F. | 180° F. | 180 + dry 72 hr at 140 |
|---|---|---|---|---|---|---|---|
| S = W107(FPO homopolymer)<br>R = C = LDPE | 10.30 | 11.20 | 11.68 | 12.75 | 11.57 | 13.72 | 83.0 |
| S = 60/40 blend W107/EG8200<br>R = C = LDPE | 23.00 | 27.62 | 26.42 | 31.80 | 31.53 | 23.88 | 27.8 |
| S = 55/45 blend W107/EG8200<br>R = C = LDPE | 51.00 | 46.24 | 44.02 | 54.89 | 42.00 | 35.63 | 51.0 |
| S = 40/60 blend W107/EG8200<br>R = C = LDPE | 140.0 | 251.4 | 157.9 | 142.0 | 197.2 | 185.1 | 188 |

What is claimed is:

1. A masking film, comprising:
   a first side having a smooth surface;
   a second side having a rough surface;
   said smooth surface of the first side capable of removably adhering to a relatively smooth surface of a substrate due to intimate contact therewith;
   said first side further comprising one or more components preselected to affect the amount of adhesion produced between the smooth surface of the first side and the relatively smooth surface of the substrate at a given temperature include at least one primary component and at least one secondary component.

2. The masking film of claim 1, wherein the at least one primary component is a flexible polyolefin (FPO).

3. The masking film of claim 2, wherein the at least one secondary component is a polyolefin.

4. The masking film of claim 3, wherein the polyolefin is acid modified, anhydride modified or acrylate modified.

5. The masking film of claim 2, wherein the at least one secondary component is selected from the group consisting of styrene block copolymers, polyesters, nylons, and blends thereof.

6. The masking film of claim 1, wherein the substrate to be protected is selected from the group consisting of polycarbonate, acrylic, polyester, glass and metals.

7. The masking film of claim 1, wherein the rough surface of the masking film is matte embossed.

8. A masking film, comprising:
   a first side having a smooth surface;
   a second side having a rough surface;
   said smooth surface of the first side capable of removably adhering to a relatively smooth surface of a substrate due to intimate contact therewith;

said first side further comprising at least one primary component and at least one secondary component preselected to affect the amount of adhesion produced between the smooth surface of the first side and the relatively smooth surface of the substrate at a given temperature;

wherein the at least one primary component is a flexible polyolefin (FPO); and wherein the at least one secondary component is selected from the group consisting of polyolefins (homopolymer or copolymer), styrenes, butylenes, polyvinyl alcohols, nylons, polyesters, polyvinyl chlorides, polymethylpentene, polyoximethylene, and blends thereof.

9. The masking film of claim 8, wherein the masking film comprises at least two layers.

10. The masking film of claim 8, wherein the first side removably adheres to the substrate at room temperature.

11. The masking film of claim 8, wherein the FPO and the at least one secondary component are selected to yield a desired level of adhesion after the substrate is dried.

12. The masking film of claim 11, wherein the at least one secondary component includes a styrene monomer tackifier.

13. The masking film of claim 8, wherein the first side remains removably adhered to the substrate following subjecting the substrate including the masking film to a heat-loading process.

14. The masking film of claim 13, wherein the heat-loading process includes thermoforming, drape-forming or heat-bending.

* * * * *